United States Patent
Shibata et al.

(10) Patent No.: US 12,301,284 B2
(45) Date of Patent: May 13, 2025

(54) SPATIAL OPTICAL COMMUNICATION SYSTEM

(71) Applicant: NIPPON TELEGRAPH AND TELEPHONE CORPORATION, Tokyo (JP)

(72) Inventors: Naotaka Shibata, Musashino (JP); Rintaro Harada, Musashino (JP); Shin Kaneko, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 166 days.

(21) Appl. No.: 18/022,196

(22) PCT Filed: Aug. 25, 2020

(86) PCT No.: PCT/JP2020/032070
§ 371 (c)(1),
(2) Date: Feb. 20, 2023

(87) PCT Pub. No.: WO2022/044134
PCT Pub. Date: Mar. 3, 2022

(65) Prior Publication Data
US 2023/0308179 A1    Sep. 28, 2023

(51) Int. Cl.
*H04B 10/11* (2013.01)
*H04B 10/114* (2013.01)
*H04B 10/294* (2013.01)

(52) U.S. Cl.
CPC ........... *H04B 10/11* (2013.01); *H04B 10/114* (2013.01); *H04B 10/294* (2013.01)

(58) Field of Classification Search
CPC .............................. H04B 10/11–118
(Continued)

(56) References Cited

U.S. PATENT DOCUMENTS 7,039,265 B2 * 5/2006 Levy ................ H05K 1/14
                                                            398/118
10,673,525 B2 * 6/2020 Boruah ............ H04B 10/1121

FOREIGN PATENT DOCUMENTS

| JP | 2009-188579 A |   | 8/2009 |           |
|----|---------------|---|--------|-----------|
| JP | 2009188579    | * | 8/2009 | H04B 10/10 |
| JP | 2017-97280 A  |   | 6/2017 |           |

OTHER PUBLICATIONS

Mohammad Taghi Dabiri et al., "On the Performance of Multiplexing FSO MIMO Links in Log-Normal Fading With Pointing Errors", J. Opt. Commun. Netw., vol. 9, No. 11, pp. 974-983, Nov. 2017.

* cited by examiner

*Primary Examiner* — Li Liu
(74) *Attorney, Agent, or Firm* — Harness, Dickey & Pierce, P.L.C.

(57) ABSTRACT

A spatial optical communication system in which a plurality of transmitters and a plurality of receivers opposite to each of the plurality of transmitters perform an optical communication in parallel, in which the plurality of transmitters transmit optical signals of same or adjacent wavelengths to the receivers of each opposite location, and has an interference blocking unit which is disposed between the transmitter and the receiver and spatially blocks an optical signal that interferes with the receiver of a non-opposite location among optical signals transmitted from the transmitter to the receiver of an opposite location. As a result, it is possible to avoid interference with other optical communications with a reduced space and at low cost, without need to supply power.

2 Claims, 8 Drawing Sheets

(58) Field of Classification Search
USPC .................................................. 398/118–131
See application file for complete search history.

SPATIAL OPTICAL COMMUNICATION SYSTEM

CROSS-REFERENCE TO RELATED APPLICATIONS

This application is a 371 U.S. National Phase of International Application No. PCT/JP2020/032070, filed on Aug. 25, 2020. The entire disclosure of the above application is incorporated herein by reference.

TECHNICAL FIELD

The present invention relates to a spatial optical communication system in which a plurality of transmitters and a plurality of receivers opposite to each of the plurality of transmitters perform optical communication in parallel.

BACKGROUND ART

Free space optics (FSO), in which optical communication is performed in a free space between a transmitter and a receiver disposed opposite to each other, is known. In FSO, a beam transmitting unit of the transmitter transmits an FSO signal by a laser beam or the like, and the beam receiving unit of the opposite receiver receives the FSO signal. As the FSO signal, for example, a very high frequency near 193 THz is used, and communication with directivity higher than that of a radio signal of a millimeter wave band (around 300 GHz) or less is performed.

The beam transmitting unit has a light-emitting element such as a laser for sending the FSO signal, and a collimator for focusing the FSO signal sent from the light-emitting element in parallel. However, the FSO signal does not become completely parallel, but gradually spreads. The degree of this spread is expressed by a divergence angle.

Here, in order to improve a communication capacity, a system in which a plurality of sets of receivers opposite to the transmitter are disposed to transmit the FSO signal in parallel is considered (e.g., see NPL 1).

CITATION LIST

Non Patent Literature

[NPL 1] J. Opt. Commun. Netw., Vol. 9, No. 11, pp. 974-983, November 2017.

SUMMARY OF INVENTION

Technical Problem

However, since the beam spreads depending on the divergence angle, the optical signal transmitted from the transmitter leaks into the adjacent receiver, and interference occurs. In order to avoid the interference, a method in which adjacent sets of transmitters transmit optical signals of different wavelengths is considered. However, there is a problem that the procurement cost of the laser parts increases as compared with a case where the same wavelength is used.

On the other hand, the longer a distance between the transmitter and the receiver is, the larger the beam spread is. Accordingly, it is necessary to widen an interval between the adjacent receivers so that the optical signal does not leak. In this case, as the number of receivers increases, the total distance required for disposing a plurality of receivers in parallel becomes longer. Therefore, when an installation space of the receivers is limited, it is difficult to install the plurality of receivers.

Further, a method of suppressing the spread of the optical signal by disposing a relay device between the transmitter and the receiver, receiving the optical signal transmitted from the transmitter once by the relay device, and retransmitting the optical signal from the relay device to the receiver has been considered. However, the relay device requires both functions of the receiver and the transmitter, which increases the device cost, and requires a power supply facility for the relay device.

An object of the present invention is to provide a spatial optical communication system capable of avoiding interference given to the optical communication of adjacent receivers with reduced space and at a low cost without a power supply, by disposing an interference blocking unit between a transmitter and a receiver when a plurality of transmitters and a plurality of receivers opposite to each of the plurality of transmitters perform the optical communication in parallel.

Solution to Problem

According to the present invention, there is provided a spatial optical communication system in which a plurality of transmitters and a plurality of receivers opposite to each of the plurality of transmitters perform optical communication in parallel, in which the plurality of transmitters transmit optical signals of the same or adjacent wavelengths to the receivers of each opposite location, and that has an interference blocking unit which is disposed between the transmitter and the receiver and spatially blocks an optical signal that interferes with the receiver of a non-opposite location among optical signals transmitted from the transmitter to the receiver of an opposite location.

Advantageous Effects of Invention

In the spatial optical communication system according to the present invention, when a plurality of transmitters and a plurality of receivers opposite to each of the plurality of transmitters perform the optical communication in parallel, by disposing an interference blocking unit between the transmitters and the receivers, it is possible to avoid interference given to the optical communication of adjacent receivers with reduced space and at a low cost without a power supply.

DESCRIPTION OF EMBODIMENTS

Hereinafter, embodiments of the spatial optical communication system according to the present invention will be described with reference to the drawings.

First Embodiment

Figure 1:
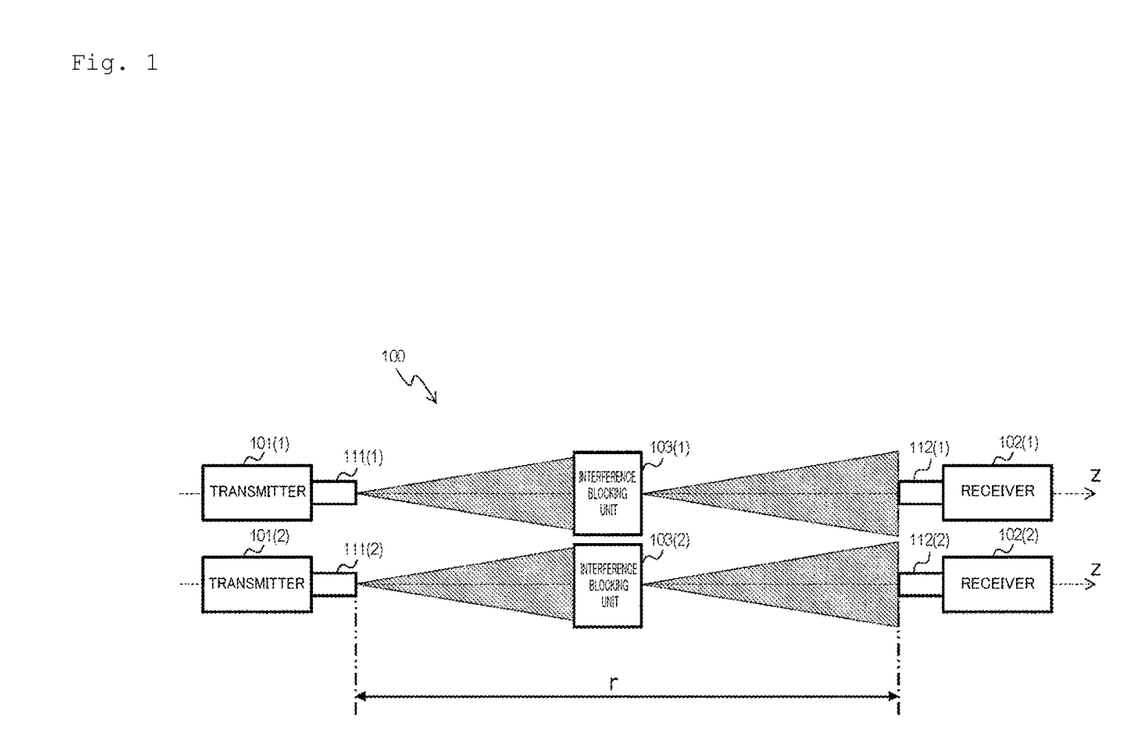
FIG. 1 is a diagram showing an example of a spatial optical communication system according to a first embodiment.

FIG. 1 shows an example of a spatial optical communication system 100 according to the first embodiment. In the example shown in FIG. 1, the spatial optical communication system 100 includes a transmitter 101(1), a transmitter 101(2), a receiver 102(1), a receiver 102(2), an interference blocking unit 103(1), and an interference blocking unit 103(2).

Here, in the description of the first embodiment and a second embodiment to be described below, for matters common to the transmitter 101(1) and the transmitter 101(2), the (number) at the end of the reference numeral is omitted and a transmitter 101 is described. Further, when referring to a specific transmitter 101, a (number) is added to the end of the reference numeral to describe the transmitter 101(1). The same also applies to other blocks having a plurality of blocks having the same function, such as the receiver 102 and the interference blocking unit 103.

In FIG. 1, the transmitter 101 has a beam transmitting unit 111, and transmits an optical signal from the beam transmitting unit 111. The receiver 102 has a beam receiving unit 112, and receives an optical signal transmitted from a beam transmitting unit 111 of the transmitter 101.

Here, the beam transmitting unit 111(1) of the transmitter 101(1) and the beam receiving unit 112(1) of the receiver 102(1) are disposed opposite to each other as one set to transmit and receive an optical signal. Similarly, the beam transmitting unit 111(2) of the transmitter 101(2) and the beam receiving unit 112(2) of the receiver 102(2) are disposed opposite to each other as one set to transmit and receive an optical signal.

In FIG. 1, a distance of a z-axis from a transmitting end of the beam transmitting unit 111(1) (or the beam transmitting unit 111(2)) to a receiving end of the beam receiving unit 112(1) (the beam receiving unit 112(2)) is r (for example, 100 m). The beam transmitting unit 111(1) and the beam transmitting unit 111(2) are disposed in parallel with each other. Similarly, the beam receiving unit 112(1) and the beam receiving unit 112(2) are disposed in parallel with each other.

Here, the spatial optical communication system 100 according to the first embodiment is effective for avoiding interference when a plurality of sets of transmitters 101 and receivers 102 disposed in parallel transmit and receive the optical signals of the same or adjacent wavelengths.

In the first embodiment, an interference blocking unit 103(1) is disposed between the beam transmitting unit 111(1) and the beam receiving unit 112(1), and an interference blocking unit 103(2) is disposed between the beam transmitting unit 111(2) and the beam receiving unit 112(2). The interference blocking unit 103 has a function of spatially blocking an optical signal leaking to the beam receiving unit 112 of the receiver 102 opposite to another transmitter 101, among beams of the optical signal transmitted from the beam transmitting unit 111 of the transmitter 101.

For example, the interference blocking unit 103(1) spatially blocks the beam of the optical signal in which the beam of the optical signal transmitted from the beam transmitting unit 111(1) leaks to the beam receiving unit 112(2) adjacent to the beam receiving unit 112(1). Similarly, the interference blocking unit 103(2) spatially blocks the beam of the optical signal transmitted from the beam transmitting unit 111(2) leaks to the beam receiving unit 112(1) adjacent to the beam receiving unit 112 (2).

Here, as shown in FIG. 1, the interference blocking unit 103 may be installed between the transmitter 101(1) and the receiver 102(1), and between the transmitter 101(2) and the receiver 102(2), separately. Alternatively, one large interference blocking unit 103 in which the interference blocking unit 103(1) and the interference blocking unit 103(2) are physically integrated may be provided. Although the optical signals of both the transmitter 101(1) and the transmitter 101(2) are blocked in the example shown in FIG. 1, the optical signal of one transmitter 101 may be blocked.

In this way, in the spatial optical communication system 100 according to the first embodiment, the plurality of transmitters 101 and the plurality of receivers 102 opposite to each of the plurality of transmitters 101 perform the optical communication in parallel. In the first embodiment, the interference blocking unit 103 which does not require power supply is disposed between the transmitter 101 and the receiver 102. Thus, it is possible to avoid interference given to an optical signal received by an adjacent receiver 102 with reduced space and at low cost without providing a power supply facility. The interference blocking unit 103 will be described below in detail.

Figure 2:
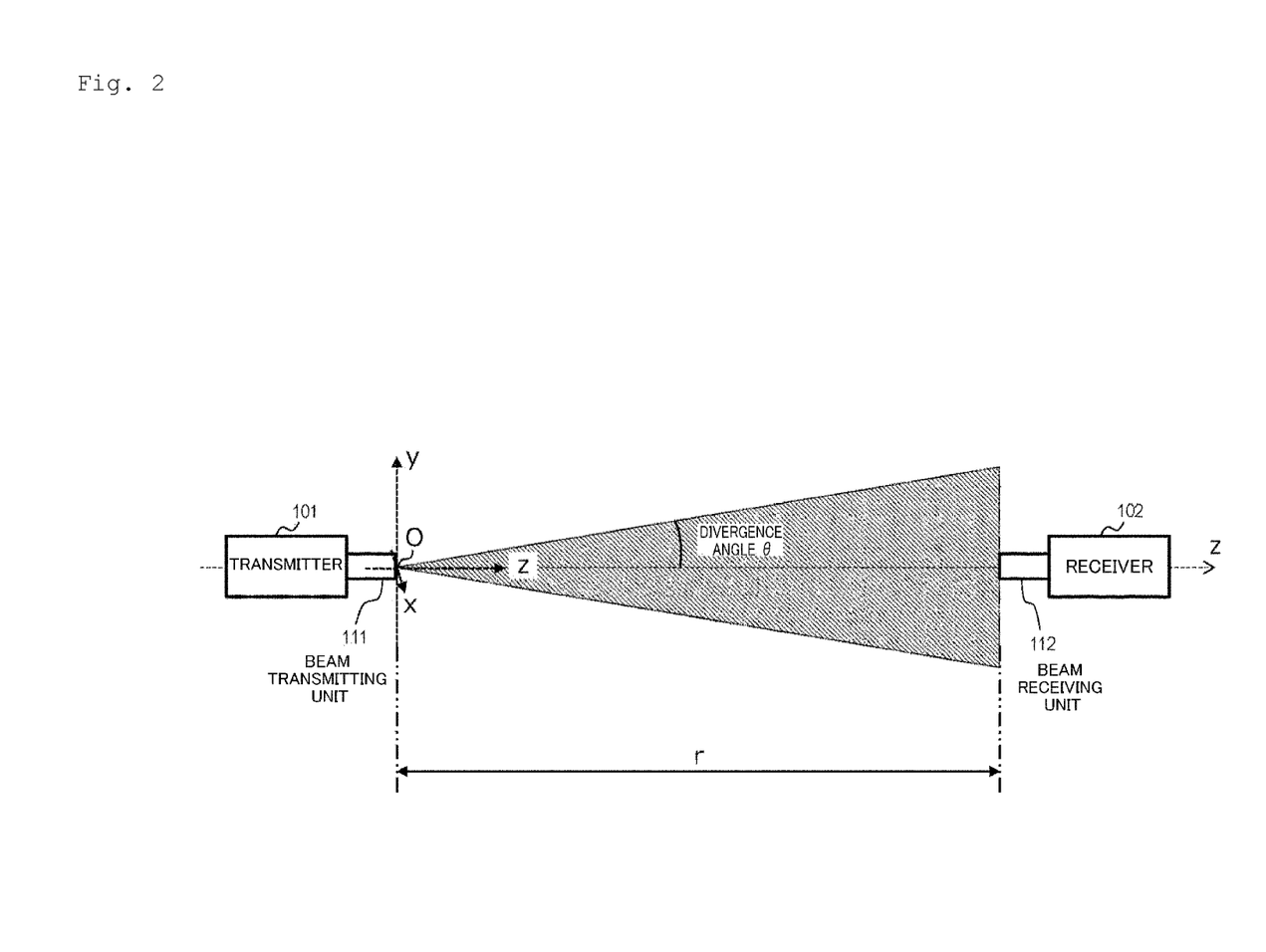
FIG. 2 is a diagram showing an example of beam of the optical communication.

FIG. 2 shows an example of a beam of an optical signal. FIG. 2 shows a state in which the beam of the optical signal transmitted from the transmitter 101 to the receiver 102 spreads, when the interference blocking unit 103 shown in FIG. 1 is not provided.

In FIG. 2, the transmitter 101 and the receiver 102 are disposed at a distance r in a z-axis direction. The beam of the optical signal transmitted from a transmitting end (origin O) of the beam transmitting unit 111 of the transmitter 101 travels, while spreading in a conical shape with a divergence angle θ in the z-axis direction. Here, a central axis of the conical beam is in the z-axis direction, and the beam is radiated on an x-y plane perpendicular to the z-axis. Therefore, when the beam has reached the beam receiving unit 112 of the receiver 102, the beam is largely spread on the x-y plane.

Figure 3:
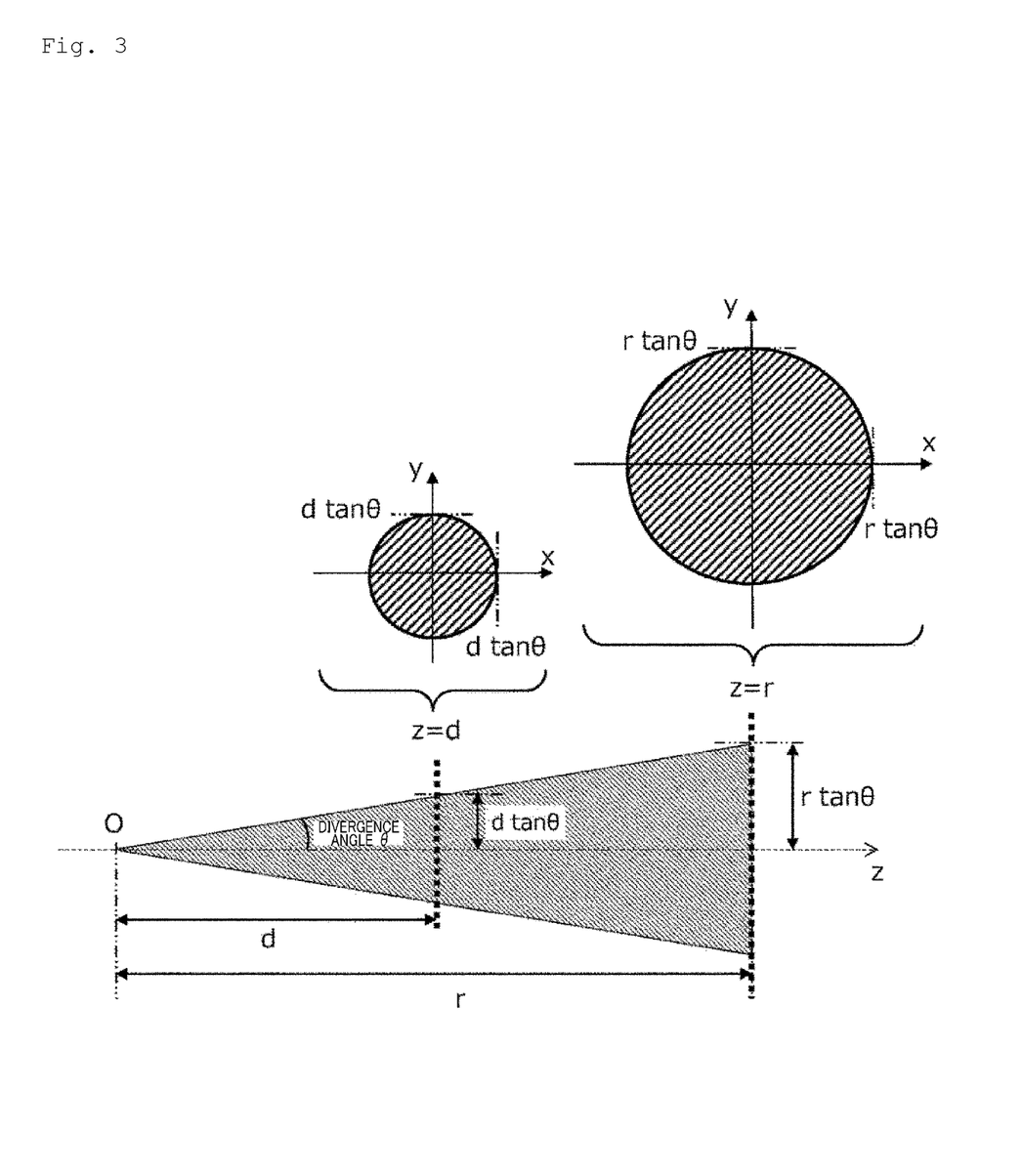
FIG. 3 is a diagram showing an example of a divergence angle of the beam.

FIG. 3 shows an example of the divergence angle of the beam. FIG. 3 shows an example of a beam spread on the x-y plane at a position where the distance from the transmitting end (origin O) of the beam transmitting unit 111 is d (z=d), and a beam spread on the x-y plane at a position of the receiving end (z=r) of the beam receiving unit 112. In FIG. 3, when the divergence angle is assumed, the spread of the beam at the position of the distance d is represented by a circle having a radius of 2d·tan θ, and the spread of the beam at the position of the distance r is represented by a circle having a radius of 2r·tan θ.

Thus, in the spatial optical communication system 100, the optical signal transmitted from the beam transmitting unit 111 of the transmitter 101 spreads conically at the divergence angle G. Therefore, when the distance between adjacent receivers 102 among the plurality of receivers 102 disposed in parallel is shorter than 2r·tan θ, interference due to an optical signal transmitted from the transmitter 101 of a non-opposite location occurs.

Figure 4:
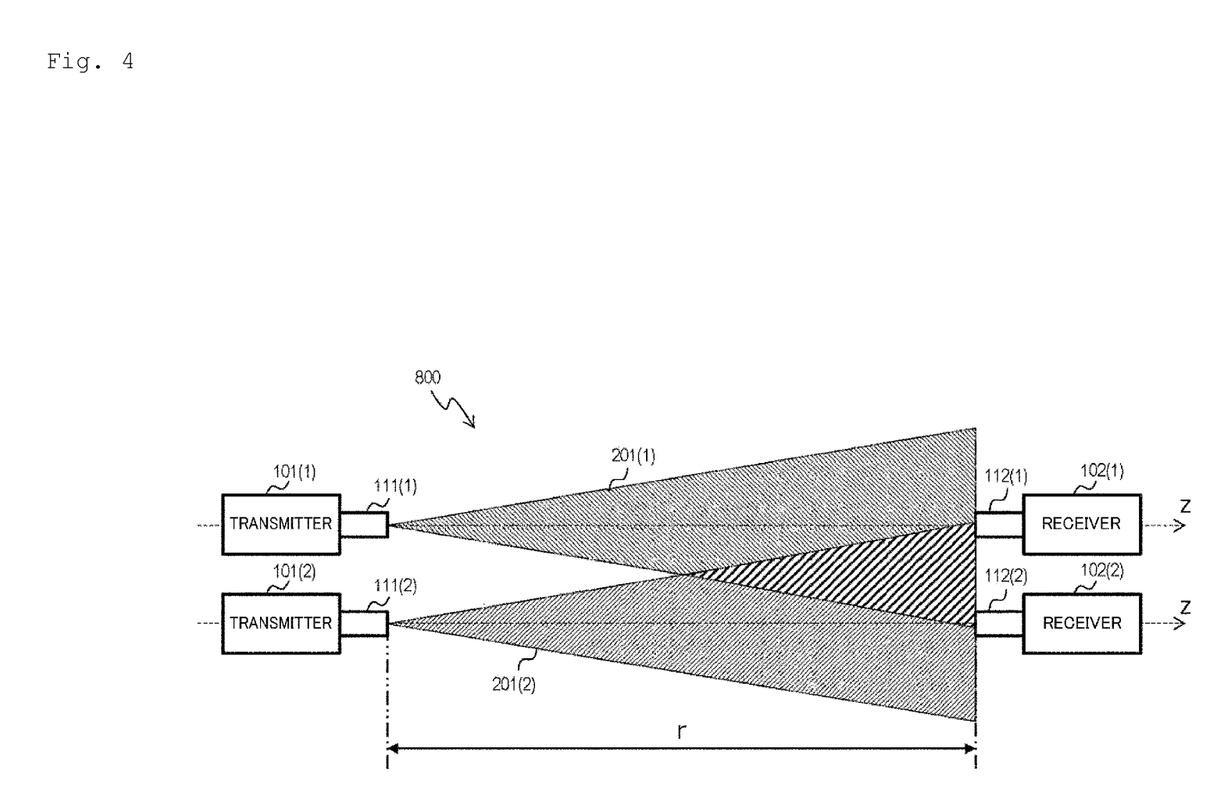
FIG. 4 is a diagram showing a spatial optical communication system of comparative example.

FIG. 4 is a diagram showing a spatial optical communication system 800 of a comparative example. The spatial optical communication system 800 of the comparative example shown in FIG. 4 does not have the interference blocking unit 103 shown in FIG. 1. Therefore, the beam 201(1) of the optical signal transmitted from the beam transmitting unit 111(1) of the transmitter 101(1) is incident not only on the beam receiving unit 112(1) of the receiver 102(1) of the opposite location, but also on the beam receiving unit 112(2) of the receiver 102(2) of the non-opposite location. Similarly, the beam 201(2) of the optical signal transmitted from the beam transmitting unit 111(2) of the transmitter 101(2) is incident not only on the beam receiving unit 112(2) of the receiver 102(2) of the opposite location, but also on the beam receiving unit 112(1) of the receiver 102 (1) of the non-opposite location.

In this manner, there arises a problem that communication in which the transmitter 101(1) and the receiver 102(1) are paired with each other, and communication in which the adjacent transmitter 101(2) and the receiver 102(2) are paired with each other interfere with each other.

Therefore, in the spatial optical communication system 100 according to the first embodiment, as shown in FIG. 1, an interference blocking unit 103 is disposed between the transmitter 101 and the receiver 102, and the beam of the optical signal incident on the receiver 102 of the non-opposite location is spatially blocked. Thus, it is possible to avoid the interference when a plurality of sets of the transmitter 101 and the receiver 102 opposite to each other are adjacently disposed in parallel.

Figure 5:
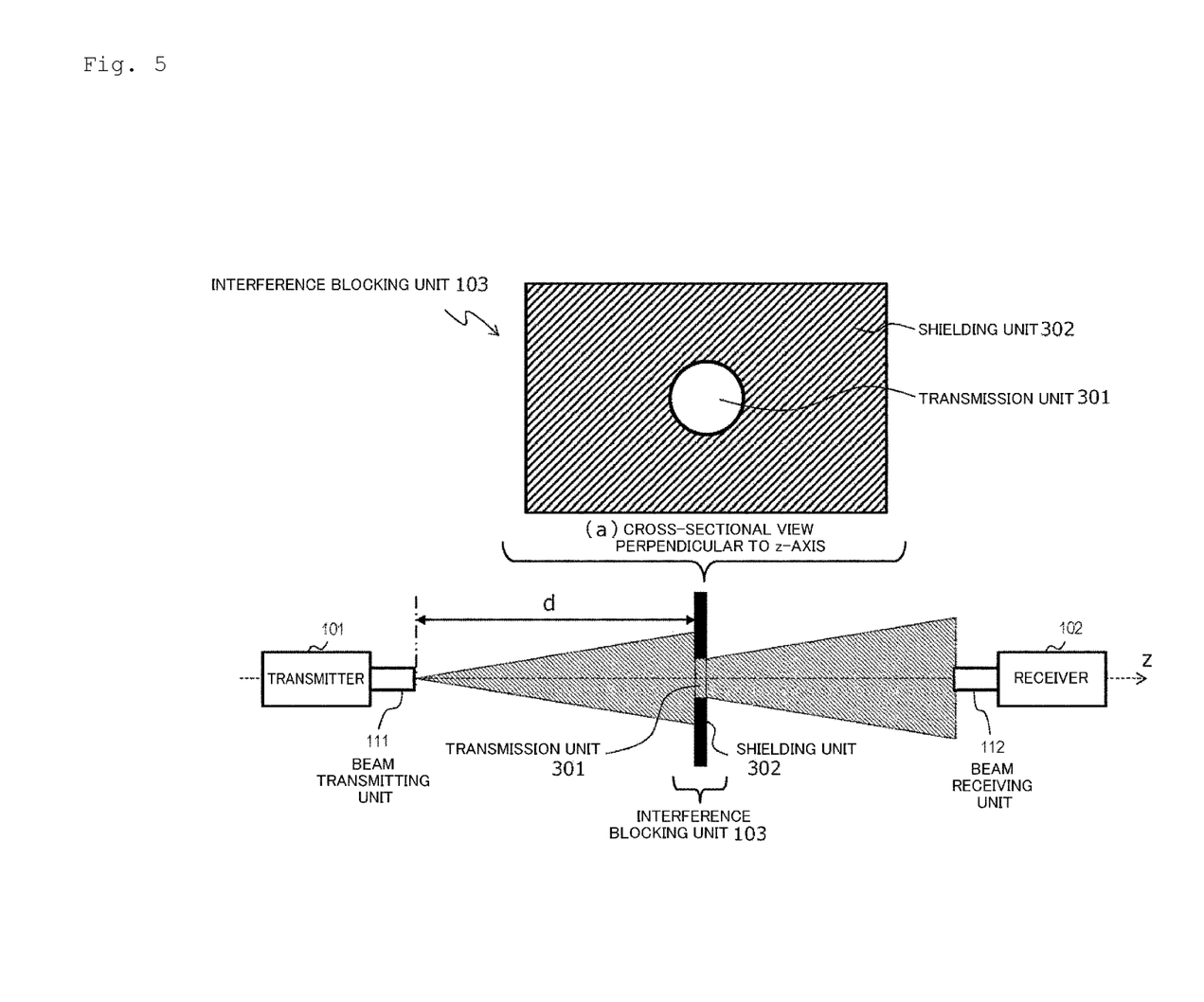
FIG. 5 is a diagram showing an example of an interference blocking unit.

FIG. 5 shows an example of the interference blocking unit 103. FIG. 5(a) shows a cross-sectional view of the interference blocking unit 103 disposed perpendicular to the z-axis between the transmitter 101 and the receiver 102. In FIG. 5, the interference blocking unit 103 has a transmission unit 301 and a blocking unit 302.

The transmission unit 301 transmits an optical signal in the vicinity of a center axis of the beam among beams of the optical signal sent from the beam transmitting unit 111 of the transmitter 101, while spreading in a conical shape, and the transmitted beam reaches the receiver 102 while spreading again, and is received by a beam receiving unit 112. Here, the transmission unit 301 is formed of a transmission material. Any material can be used as the transmission material as long as it can transmit an optical signal. For example, when the transmission material is air, that is, when only a hole is formed in the blocking unit 302, there is a possibility that the signal spreads by diffraction. However, if it has a frequency band having high linearity of light or the like, the influence of diffraction is small. Alternatively, when the transmission unit 301 is a lens, the effect of focusing the transmitted optical signal to suppress divergence can be obtained.

The blocking unit 302 blocks the outer peripheral portion of the beam of the optical signal transmitted from the beam transmitting unit 111 of the transmitter 101 while spreading in a conical shape, and the blocked beam does not reach the beam receiving unit 112 of the receiver 102. In this case, since the leakage of the beam to the other adjacent receiver 102 described in FIG. 4 can be suppressed, interference between the receivers 102 disposed in parallel can be avoided. The blocking unit 302 is formed of a blocking material for blocking an optical signal. As the blocking material, for example, any material can be used as long as it is possible to block light, such as a metal, concrete, and cloth.

Here, when a distance from a tip of the beam transmitting unit 111 of the transmitter 101 to the interference blocking unit 103 is represented by d and a divergence angle is represented by θ, the diameter of the transmission unit 301 is designed to be smaller than 2d·tan θ. Thus, since the outer peripheral part of the beam of the optical signal is blocked, the spread of the beam in the receiver 102 is suppressed. It is preferable to dispose the beam center axis to pass through the center of the transmission unit 301.

In this way, in the spatial optical communication system 100 according to the first embodiment, the interference blocking unit 103 which does not require power supply is disposed between the plurality of receivers 102 opposite to each of the plurality of transmitters 101. Thus, it is possible to avoid the interference given to optical communication of the adjacent receiver 102 with a reduced space and at low cost, without providing a power supply facility.

Second Embodiment

Figure 6:
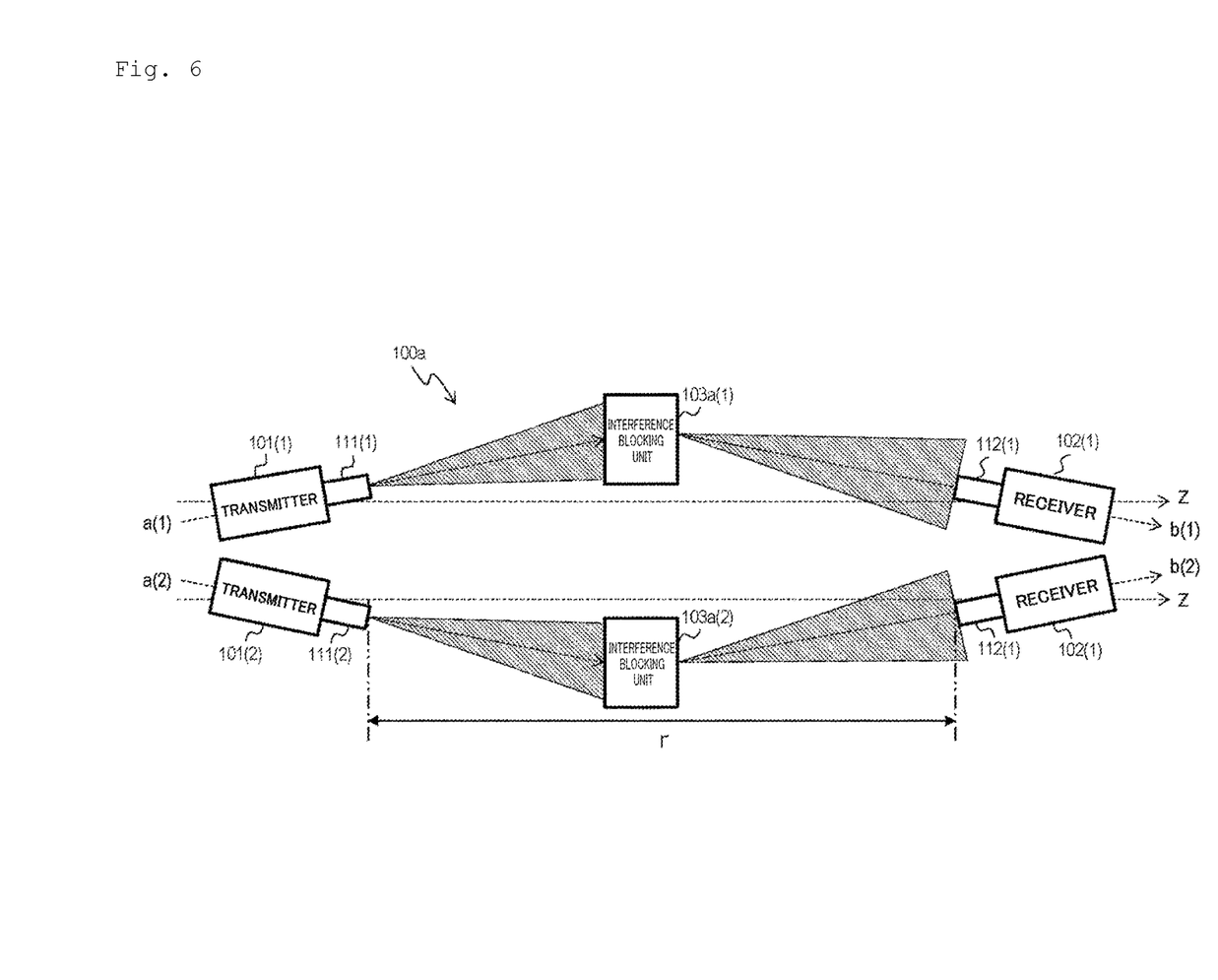
FIG. 6 is a diagram showing an example of a spatial optical communication system according to a second embodiment.

FIG. 6 shows an example of a spatial optical communication system 100a according to the second embodiment.

In FIG. 6, the transmitter 101, the beam transmitting unit 111, the receiver 102, and the beam receiving unit 112 have the same functions as those of the blocks having the same reference numerals as those described in FIG. 1.

Here, a spatial optical communication system 100a according to the second embodiment is effective for avoiding interference, when a plurality of sets of transmitter 101 and receiver 102 disposed in parallel transmit and receive optical signals of the same or adjacent wavelengths, similarly to the first embodiment.

FIGS. 1 and 6 are different in the transmitting direction of the beam transmitting unit 111 of the transmitter 101. Similarly, the receiving direction of the beam receiving unit 112 of the receiver 102 is also different. In FIG. 1, a beam transmitting unit 111 transmits an optical signal so that the z-axis direction connecting the transmitter 101 and the receiver 102 of the opposite location becomes the beam center axis of the optical signal. In contrast, in FIG. 6, the optical signal is transmitted so that the direction of a(1)-axis or a(2)-axis connecting the transmitter 101 and the interference blocking unit 103 becomes the beam center axis of the optical signal. Similarly, in the receiver 102, the receiver 102 receives the optical signal such that the direction of b(1)-axis or b(2)-axis connected to the interference blocking unit 103 becomes the beam center axis of the optical signal.

In this way, in the spatial optical communication system 100a according to the second embodiment, since the beams of the optical signals transmitted from the adjacent transmitter 101 are directed in the opposite direction (a direction separated outward), interference is less likely to occur than the spatial optical communication system 100 according to the first embodiment. In FIG. 6, the z-axis corresponds to the first axis, the a-axis (a(1)-axis and a(2)-axis) corresponds to the second axis, and the b-axis (b(1)-axis and b(2)-axis) corresponds to the third axis, respectively.

In the example shown in FIG. 6, although the optical signals of each of the transmitter 101(1) and the transmitter 101(2) are blocked by the interference blocking unit 103(1) and the interference blocking unit 103(2), only one of the interference blocking unit 103(1) and the interference blocking unit 103(2) may be disposed. The transmitter 101 and the receiver 102, in which the interference blocking unit 103 is not disposed, are disposed in the Z-axis direction, as in FIG. 1. In this case, the same interference blocking unit 103 may be disposed on the z-axis as in FIG. 1, or when interference can be avoided due to a deviation between the center axis (b-axis) and the z-axis of the beam received by the beam receiving unit 112 as in FIG. 6, the interference blocking unit 103 may be eliminated.

Figure 7:
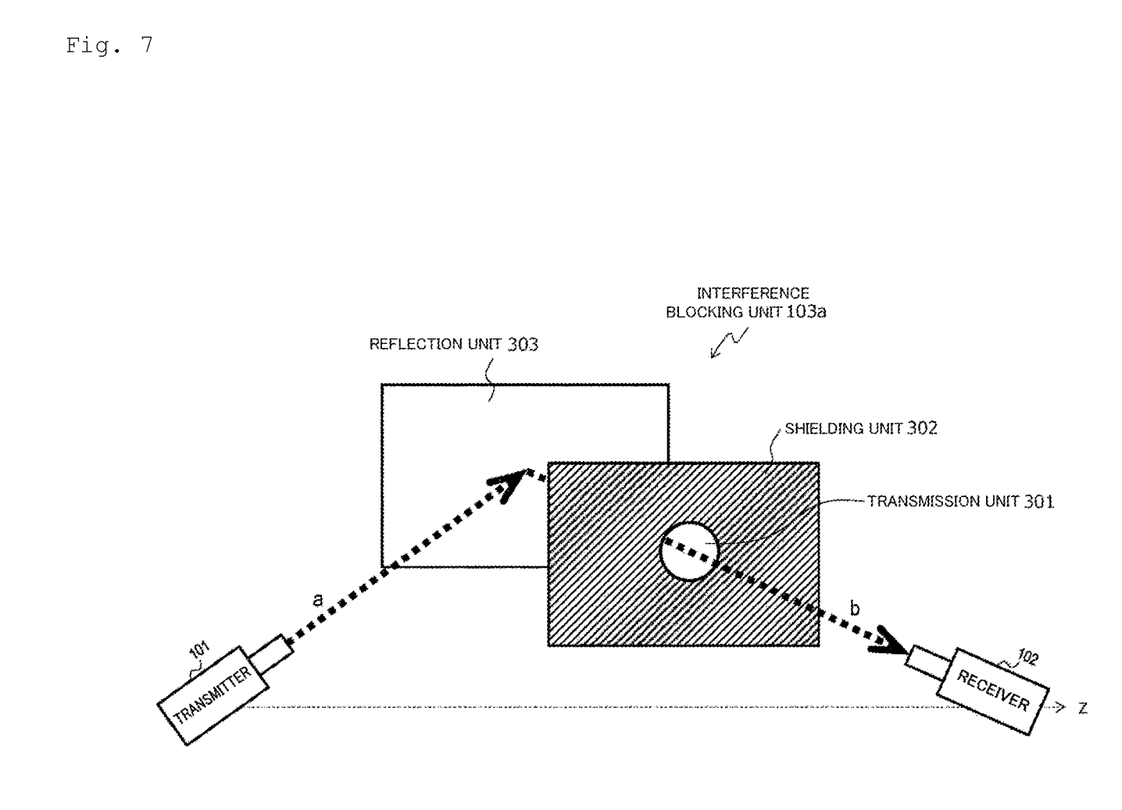
FIG. 7 is a diagram showing an example of an interference blocking unit of the second embodiment.

FIG. 7 shows an example of the interference blocking unit 103a of the second embodiment. In FIG. 7, the interference blocking unit 103a has a transmission unit 301 and a blocking unit 302, similarly to the interference blocking unit 103 described in FIG. 5. Further, the interference blocking unit 103a has a reflection unit 303 that reflects the beam of the optical signal, which is transmitted from the transmitter 101 in the a-axis direction, in the b-axis direction in which the receiver 102 of the opposite location is disposed. Here, an angle (incident angle) formed by a surface of the reflection unit 303 and the a-axis is equal to an angle (reflection angle) formed by the surface of the reflection unit 303 and the b-axis. That is, the beam of the optical signal transmitted from the transmitter 101 can be reflected in the direction of the receiver 102, by adjusting the inclination (incident angle (reflection angle)) of the reflection unit 303, on the basis of the distance between the transmitter 101 and the receiver 102, and the installation position of the reflection unit 303. In this case, the beam transmitting unit 111 of the transmitter 101 and the beam receiving unit 112 of the receiver 102 are adjusted in the direction of the reflection unit 303. In the example shown in FIG. 7, the surface of the reflection unit 303 is disposed in the z-axis direction. However, as long as there is an angle capable of reflecting the optical signal of the transmitter 101 in the direction of the receiver 102, it is not necessary to be disposed in the z-axis direction. Similarly to FIG. 5 of the first embodiment, if the distance from the beam transmitting unit 111 to the transmission unit 301 is approximately set to d, a diameter of the transmission unit 301 is designed to be smaller than $2d \cdot \tan \theta$.

In the example shown in FIG. 7, the transmission unit 301 transmits an optical signal in the vicinity of the beam center axis (b-axis) among the beams of the optical signal reflected by the reflection unit 303. The blocking unit 302 blocks the optical signal except for the part of the transmission unit 301 near the beam center axis among the beams of the optical signal reflected by the reflection unit 303.

Here, the reflection unit 303 is, for example, a mirror, and is installed so that an incident angle from the beam transmitting unit 111 of the transmitter 101 to the mirror is equal to a reflection angle from the mirror to the beam receiving unit 112 of the receiver 102.

Although FIG. 7 shows an example in which the blocking unit 302 having the transmission unit 301 is disposed in parallel with the reflection unit 303, the blocking unit 302 is not required to be parallel. In FIG. 7, the transmission unit 301 is not required to be circular, and may be, for example, polygonal or elliptical.

Figure 8:
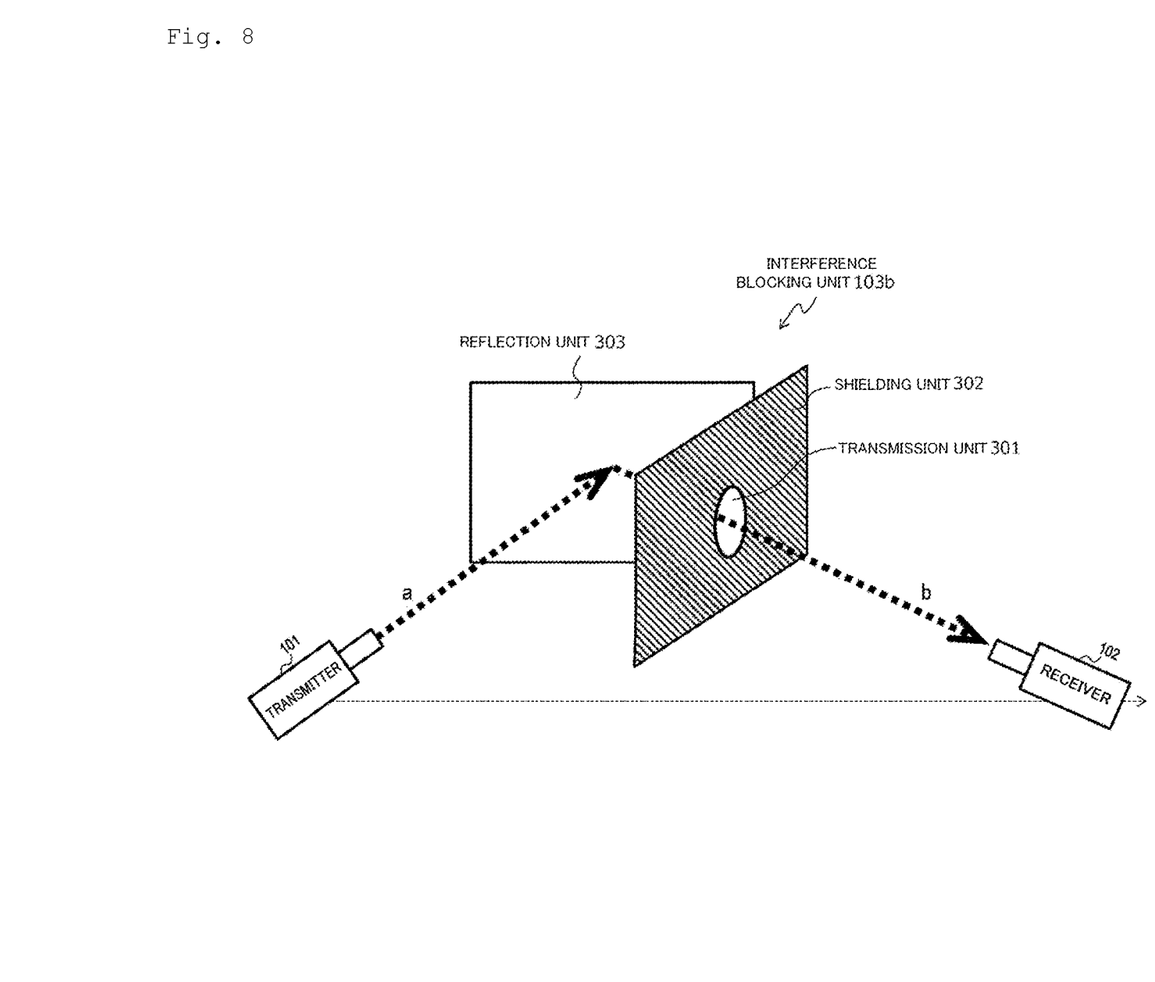
FIG. 8 is a diagram showing an example of an arrangement direction of a blocking unit.

FIG. 8 shows an example of the arrangement direction of the blocking unit 302. A difference between the interference blocking unit 103b shown in FIG. 8 and the interference blocking unit 103a shown in FIG. 7 is only the arrangement direction of the blocking unit 302. In FIG. 8, the surface of the blocking unit 302 having the transmission unit 301 is disposed to be perpendicular to the beam center axis (b-axis) of the optical signal reflected by the reflection unit 303. As a result, the optical signal reflected by the reflection unit 303 can be efficiently irradiated to the receiver 102 as compared with the example shown in FIG. 7. In addition, like FIG. 7, in FIG. 8, the transmission unit 301 is not required to be circular, and may be, for example, polygonal or elliptical.

In this way, in the spatial optical communication system 100a according to the second embodiment, the beam of the optical signal is transmitted in a direction different from the z-axis direction connecting the transmitter 101 and the receiver 102 of the opposite location. Further, the beam of the optical signal transmitted from the transmitter 101 is reflected in the direction of the receiver 102 by the reflection unit 303. Further, the beam of the optical signal reflected by the reflection unit 303 blocks an outer peripheral part of the beam of the reflected optical signal by the transmission unit 301 and the blocking unit 302 disposed between the reflection unit 303 and the receiver 102, transmits the vicinity of the center axis of the beam, and is received by the receiver 102.

Similarly to the first embodiment, also in the spatial optical communication system 100a according to the second embodiment, the interference blocking unit 103a does not require power supply, and can avoid interference given to the optical communication of the adjacent receiver 102 with a reduced space and at a low cost.

As described above, in the spatial optical communication system according to the present invention, when a plurality of transmitters and a plurality of receivers opposite to each of the plurality of transmitters perform the optical communication in parallel, the interference blocking unit is disposed between the transmitters and the receivers. Thus, the interference given to the optical communication of the adjacent receiver can be avoided with a reduced space and at a low cost, without the need for power supply.

REFERENCE SIGNS LIST 100, 800 Spatial optical communication system
101 Transmitter
102 Receiver
103, 103a, 103b Interference blocking unit
111 Beam transmitting unit
112 Beam receiving unit
201 Beam
301 Transmission unit
302 Blocking unit
303 Reflection unit

The invention claimed is:

1. A spatial optical communication system in which a plurality of transmitters and a plurality of receivers opposite to each of the plurality of transmitters perform optical communication in parallel, wherein
the plurality of transmitters transmit optical signals of the same or adjacent wavelengths to the receivers of respective opposite locations,
comprising an interference blocking unit which is disposed between the transmitter and the receiver and spatially blocks an optical signal that interferes with the receiver of a non-opposite location among optical signals transmitted from the transmitter to the receiver of an opposite location;
wherein the transmitter transmits the optical signal so that a second axial direction different from a first axial direction connecting the transmitter and the receiver of an opposite location becomes a beam center axis of the optical signal, and
the interference blocking unit has
a reflection unit which reflects a beam of the optical signal, which is transmitted from the transmitter in the second axis direction, in a third axis direction in which the receiver of an opposite location is disposed,
a transmission unit which transmits an optical signal in the vicinity of a beam center axis among beams of the optical signal reflected by the reflection unit, and
a blocking unit which blocks the optical signal except the vicinity of the beam center axis.

2. The spatial optical communication system according to claim 1, wherein when a distance from the transmitter to the transmission unit is set as d and a divergence angle of the beam is set as θ, a diameter of the transmission unit of the interference blocking unit is smaller than 2d·tan θ.

\* \* \* \* \*